US012709309B2

(12) United States Patent
Reich et al.

(10) Patent No.: US 12,709,309 B2
(45) Date of Patent: Aug. 18, 2026

(54) DISCHARGE NOZZLE FOR DISCHARGING GRIT OR LUBRICANT

(71) Applicant: NOWE GMBH, Elze (DE)

(72) Inventors: Alexander Reich, Elze (DE); Adrien Perrier, Elze (DE)

(73) Assignee: NOWE GMBH, Elze (DE)

( * ) Notice: Subject to any disclaimer, the term of this patent is extended or adjusted under 35 U.S.C. 154(b) by 809 days.

(21) Appl. No.: 18/095,371

(22) Filed: Jan. 10, 2023

(65) Prior Publication Data

US 2023/0311137 A1 Oct. 5, 2023

(30) Foreign Application Priority Data

Mar. 31, 2022 (EP) ..................................... 22165815

(51) Int. Cl.

| | |
|---|---|
| ***B61C 15/10*** | (2006.01) |
| ***B05B 1/02*** | (2006.01) |
| ***B05B 1/28*** | (2006.01) |
| ***B05B 12/18*** | (2018.01) |
| ***B61K 3/02*** | (2006.01) |

(52) U.S. Cl.

CPC .............. *B61C 15/102* (2013.01); *B05B 1/02* (2013.01); *B05B 1/28* (2013.01); *B05B 12/18* (2018.02); *B61C 15/10* (2013.01); *B61K 3/02* (2013.01)

(58) Field of Classification Search

CPC .. B05B 1/28; B05B 12/18; B05B 1/02; B61C 15/102; B61C 15/10; B61K 3/02; B61K 3/00

See application file for complete search history.

(56) References Cited

U.S. PATENT DOCUMENTS 791,640 A * 6/1905 Miner ........................ B61K 3/02 239/173
2,451,878 A * 10/1948 Savercool ............. B61C 15/102 291/46
2,528,801 A * 11/1950 Turner, Jr. ............ B61C 15/102 291/46

(Continued)

FOREIGN PATENT DOCUMENTS

DE 202005017304 U1 * 1/2006 ............. B61C 15/10
DE 202009008002 U1 * 8/2009 ............. B61C 15/10

(Continued)

OTHER PUBLICATIONS

Search report for EP application No. 22165815.6 (5 pages).

*Primary Examiner* — Cheng Lin
(74) *Attorney, Agent, or Firm* — K&L Gates LLP

(57) ABSTRACT

The invention pertains to a discharge nozzle for discharging grit or lubricant into the gap between a rail and a track wheel of a rail vehicle, with the discharge nozzle comprising a base body with at least one connection for being connected to a conveyor line for the grit or lubricant and an outlet that is connected to the connection via a channel. In order to achieve an efficient and purposeful discharge of the majority of grit and/or lubricant into the gap between the rail and the track wheel, the outer contour of the base body is in the longitudinal direction shaped in a convex manner at least in the rear region lying opposite of the outlet and, if applicable, surrounded by an attachment such that the air flowing around the base body is accelerated in the direction of the outlet.

20 Claims, 9 Drawing Sheets

(56) References Cited

U.S. PATENT DOCUMENTS

| | | | | | |
|---|---|---|---|---|---|
| 2,654,622 | A * | 10/1953 | Foster | B61C 15/102 | 451/75 |
| 3,121,578 | A * | 2/1964 | Moses | B61C 15/102 | 222/494 |
| 3,185,512 | A * | 5/1965 | Kilgore | B61C 15/102 | 239/602 |
| 5,477,941 | A * | 12/1995 | Kumar | B61C 15/107 | 184/6 |
| 5,896,947 | A * | 4/1999 | Kumar | B61K 3/02 | 184/6.4 |
| 6,588,808 | B1 * | 7/2003 | Sheppard | B61C 15/102 | 291/1 |
| 12,060,089 | B2 * | 8/2024 | Mitchell | B05B 15/58 | |
| 2014/0151460 | A1 * | 6/2014 | Noffsinger | B61C 15/10 | 239/69 |
| 2020/0361499 | A1 * | 11/2020 | Reich | G07C 9/00174 | |

FOREIGN PATENT DOCUMENTS

| | | | | |
|---|---|---|---|---|
| DE | 102013016143 | A1 * | 4/2015 | B61C 15/102 |
| EP | 0027528 | B1 | 7/1983 | |
| EP | 0703135 | B1 | 6/1996 | |
| WO | 2015044245 | A1 | 4/2015 | |

* cited by examiner

DISCHARGE NOZZLE FOR DISCHARGING GRIT OR LUBRICANT

CROSS-REFERENCE TO RELATED APPLICATIONS

This application claims priority to EP Patent Application No. 22165815.6 (filed 31 Mar. 2022), the entire disclosure of which is incorporated herein by reference.

BACKGROUND

Technical Field

The invention pertains to a discharge nozzle for discharging grit or lubricant into the gap between a route (e.g., a rail) and a wheel of a vehicle (e.g., a rail vehicle), with the discharge nozzle comprising a base body with at least one connection for being connected to a conveyor line for the grit or lubricant and an outlet that is connected to the connection via a channel.

Discussion of Art

Discharge nozzles of this type are used for discharging grit or lubricant to improve the contact between a rail and a track wheel of a rail vehicle. This contact between the rail and the track wheel plays a decisive role for the dynamics of a rail vehicle because the driving and braking forces, as well as the tracking forces and weight forces, have to be transmitted via a relatively small contact surface. In this context, the friction ratio between rail and track wheel defines the optimal force transmission. Permanently changing conditions exist at the transition between the rail and the track wheel as soon as the rail vehicle is in motion. In addition to the degree of dirt accumulation, the track profile also plays an important role for the respectively current state in the contact point between rail and track wheel, particularly while driving around curves. Sanding and lubricating systems are used in rail vehicles to minimize the extreme influences and the associated negative effects on the braking distance and the wear (stick-slip effect).

Grit, particularly sand, is used for increasing the friction between the rail and the track wheel and for thereby respectively reducing the braking distance and simplifying the start of the rail vehicle. Lubricants are used for optimizing the coefficient of friction to reduce the wear of the track wheel and the rail, among other things in the region of the wheel flange, and for reducing the noise development, primarily while driving around curves or during pendulum motions of the rail vehicle. Grit and lubricant can be discharged separately of one another or also jointly in the form of a mixture that optimizes the coefficient of friction.

Conventional discharge nozzles usually converge toward the outlet. Such discharge nozzles are described, for example, in WO 2015/044245 A1 or in U.S. Pat. No. 2,451,878 A.

To improve the flow profile, it has been proposed, e.g. in DE 20 2005 017 304 U1, to design the underside of the sanding nozzle in a convex manner to generate a suction effect and to keep the sanding channel and the conveyor hose dry and free of dust. However, the increasing channel cross section toward the outlet of the nozzle does not contribute to an improvement of the purposeful introduction of the sand into the gap between the rail and the track wheel.

The efficiency of the discharged quantity of grit or lubricant or a mixture thereof is highly dependent on the aerodynamic influences that occur in the immediate vicinity in front of the gap between rail and track wheel and tend to deflect the jet of grit or lubricant outward as the speed of the rail vehicle increases. The discharged grit or lubricant tends to be deflected outward due to the aerodynamic flow forces that act in the gap between the rail and the track wheel and are already pronounced at slow speeds of the rail vehicle. This significantly reduces the required effect of the grit, particularly at high vehicle speeds.

Another important factor for the material consumption of grit or lubricant is the shape of the discharge nozzle. Since the discharged jet of grit or lubricant has a pronounced conical shape and a minimum clearance has to be observed in the positioning of the discharge nozzle (normative requirement), the projected surface of the discharged jet is significantly wider than the surface of the rail. This results in a high consumption of grit or lubricant, which in turn leads to additional energy consumption (stockpiling, refilling, cleaning, disposal) and to environmental pollution.

In currently used discharge nozzles, only a small proportion (usually less than 40%) of the discharged mediums for improving the coefficient of friction reaches the effective surface between the rail and the track wheel. The remainder ends up in the surroundings of the rail and, under certain circumstances, even has to be vacuumed off and collected or disposed.

BRIEF DESCRIPTION

The present invention therefore is based on the objective of creating an aforementioned discharge nozzle for discharging grit or lubricant, by which the highest possible proportion of the discharged medium actually reaches an intended destination, namely the gap between a route (e.g., rail) and vehicle wheel (e.g., track wheel). The proportion of mediums for improving the coefficient of friction, which ends up in the effective surface between the route and wheel, and the degree of efficiency of the discharge should be increased as far as possible and the smallest possible quantity of grit or lubricant should be lost and discharged into the surroundings adjacent to the route. It should be ensured that sufficient grit or lubricant for ensuring the effect of the grit or lubricant is introduced between the route and the wheel, particularly also at high speeds of the vehicle. The disadvantages of hitherto existing discharge nozzles should be avoided or at least reduced.

The above-defined objective of the invention is attained in that the outer contour of the base body of the discharge nozzle is in the longitudinal direction shaped in a convex manner at least in the rear region lying opposite of the outlet such that the air flowing around the base body is accelerated in the direction of the outlet. As a result of the convex shape of the outer contour of at least the rear portion of the discharge nozzle, the air flowing around the base body is constricted and accelerated toward the outlet of the discharge nozzle due to the Coandă effect such that the grit or lubricant jet is purposefully transported into the annular gap between the rail and the track wheel in a more concentrated manner. Due to this concentration and acceleration of the jet, the air flow caused by the motion of the rail vehicle, particularly at higher speeds, has less influence on the grit and lubricant jet and the deflection of this jet is reduced. As a result, a higher proportion of grit or lubricant can end up in the effective surface between the rail and the track wheel. The usable proportion of grit and lubricant can be increased to as much as 80%. Such a discharge nozzle can be very easily and cost-effectively manufactured, particularly in the case of a rotationally symmetrical shape. However, a simple and cost-effective manufacture is also possible if the shape of the discharge nozzle deviates from a rotationally symmetrical shape, e.g. by means of 3D printing.

According to a characteristic of the invention, the outer contour of the base body of the discharge nozzle may also be shaped in a convex manner in the longitudinal direction over the entire length. In this way, a particularly high concentration and acceleration of the air surrounding the discharge nozzle toward the outlet of the discharge nozzle can be achieved.

A circumferential attachment is advantageously arranged in the rear region of the base body and an annular gap is formed between the surface of the base body and the inner side of the attachment. Such an attachment makes it possible to additionally improve the Coandă effect, i.e. the acceleration of the air flowing through the annular gap past the surface of the base body of the discharge nozzle. Such a two-part design of the discharge nozzle consisting of correspondingly designed base body and attachment allows particularly concentrated grit and lubricant jets, which are also not significantly deflected at high speeds of the rail vehicle. Since the attachment has to be correspondingly fastened on the base body of the discharge nozzle, e.g. by means of webs or the like, the annular gap formed between the surface or outer contour of the base body and the inner side of the attachment is interrupted by the webs or the like, but this does not significantly affect the function of the discharge nozzle.

The acceleration of the air flowing around the surface of the base body of the discharge nozzle can be additionally increased if the annular gap is tapered in the direction of the outlet.

According to another characteristic of the invention, the attachment is arranged to be adjustable relative to the base body in the longitudinal direction. Such an adjustability, which may also be realized automatically, e.g., by means of corresponding servomotors, makes it possible to change the acceleration of the flow. For example, the acceleration of the air flowing around the discharge nozzle can be controlled in dependence on the speed of the rail vehicle such that an optimal transport of the grit or lubricant to the gap between the rail and the track wheel is achieved at all vehicle speeds.

A preferred direction or a twist can be imparted on the grit or lubricant jet if air control elements for conducting the flow of the surrounding air are arranged on the inner side of the attachment and/or on the surface of the base body. In this way, the grit or lubricant jet can be steered in the direction of the wheel flange of the track wheel. This results in an even higher degree of efficiency during the discharge of grit or lubricant. The air control elements may be designed in different ways. The air control elements may be integrally manufactured during the production of the base body or the attachment.

According to an embodiment of the invention, the air control elements may be arranged to be adjustable. In this way, the flow of the surrounding air can be changed, e.g. adapted to the speed of the rail vehicle. If the air control elements are arranged in an adjustable manner, they naturally cannot be manufactured integrally during the production of the base body or the attachment. The adjustability can be achieved mechanically, but also electrically by means of corresponding servomotors.

The air control elements may be realized in the form of blades, where the blades may be arranged obliquely referred to the longitudinal direction. Such obliquely arranged blades in the annular gap between the base body and the attachment of the discharge nozzle make it possible to generate a vortex effect of the surrounding air, where the vortex effect steers the surrounding air and therefore the grit or lubricant jet in the desired direction, particularly to the wheel flange of the track wheel.

In an expanded embodiment of the discharge nozzle, the attachment is closed in the region of the at least one connection and at least one compressed air connection for being connected to a compressed air line is arranged on the attachment. In this embodiment, the compressed air supplied via the compressed air connection replaces the surrounding air. The compressed air is concentrated and accelerated due to the design of the base body and the attachment of the discharge nozzle such that the flow profile of the grit or lubricant can be optimized and the degree of efficiency of the discharge system can be improved. During the transport of the grit or lubricant, the compressed air can be blown in, e.g. with a pressure of 1 to 2 bar, either continuously or in the form of pulses that are separated in time. This embodiment is particularly suitable for instances, in which the discharge nozzle is installed in the rail vehicle in a tightly packed manner and little or no access for the surrounding air exists. This is the case, for example, in streetcars, particularly low-floor streetcars.

The base body and/or the attachment can be manufactured of metal, particularly aluminum or an aluminum alloy, such as in a 3D printing process. Metal is particularly suitable due to its resilience and durability.

The base body and/or the attachment can alternatively also be manufactured of a suitable plastic, such as in a 3D printing process. Certain plastics also have a high durability and usually a lower weight than metals. Furthermore, plastic components frequently can be manufactured easier and more cost-effectively than comparable metal components. Combinations such as a base body of metal and an attachment of plastic are also possible.

A simple installation on and removal from the conveyor line can be realized if the at least one connection of the discharge nozzle is provided with a thread.

Icing of the outlet can be effectively prevented, and a flawless function can also be ensured at low ambient temperatures if a heater is arranged in the base body of the discharge nozzle. In metallic discharge nozzles, electric resistance heaters are particularly suitable for heating at least the region around the outlet.

An additional improvement of the purposeful introduction of the grit and/or lubricant into the gap between the rail and the track wheel of the rail vehicle can be achieved if the outlet of the discharge nozzle is arranged obliquely at an acute angle to the longitudinal axis. The acute angle relative to the longitudinal axis of the discharge nozzle particularly lies in a range between approximately 30° and 60°. An even more purposeful introduction of the grit or lubricant can be achieved due to the oblique arrangement of the outlet and a corresponding orientation of the discharge nozzle with respect to the gap between the rail and the track wheel.

A circular cross-sectional design of the base body and/or the attachment results in a simplified manufacturability. Furthermore, the effect of the discharge nozzle is not dependent on the alignment around the longitudinal axis in this case.

However, an additional improvement of the flow profile can be achieved under certain circumstances if the base body and/or the attachment of the discharge nozzle are designed with an elliptical cross section. The higher manufacturing effort in comparison with a rotationally symmetrical discharge nozzle is also kept within reasonable limits if a 3D printing method is used. The asymmetric grit or lubricant jet can also be changed by correspondingly rotating the discharge nozzle with elliptical cross section about the longitudinal direction.

The invention also pertains to a device for discharging grit or lubricant into the gap between a rail and a track wheel of a rail vehicle with an above-described discharge nozzle that is arranged at the end of the conveyor line. The inventive design of the discharge nozzle makes it possible to significantly increase the proportion of grit or lubricant that ends up in the effective surface between the rail and the track wheel and to save material and energy.

BRIEF DESCRIPTION OF THE DRAWINGS

The present invention is described in greater detail below with reference to the attached drawings that show different embodiments of discharge nozzles for discharging grit and/or lubricant into the gap between a rail and a track wheel of a rail vehicle. In these drawings.

DETAILED DESCRIPTION

Figure 1:
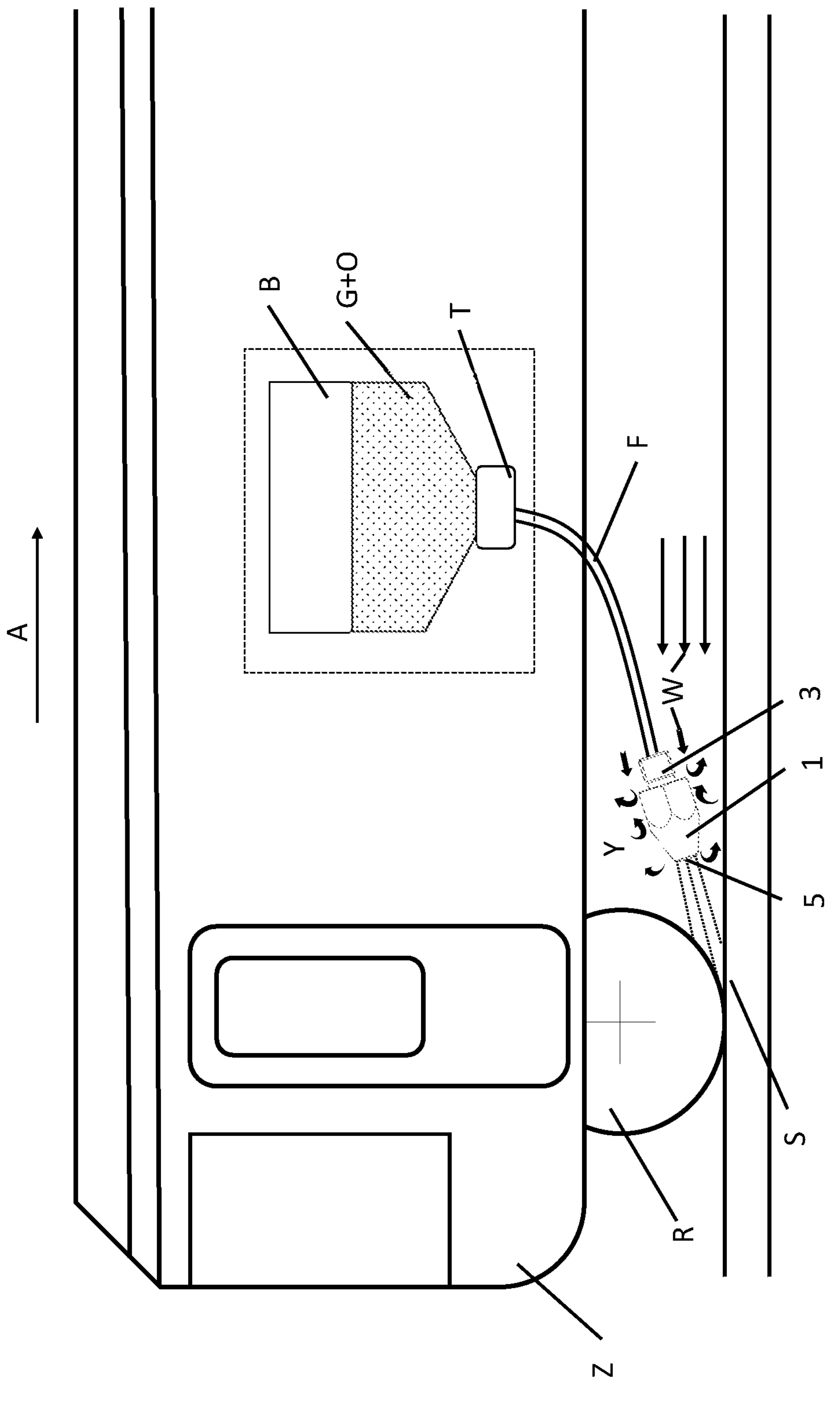
FIG. 1 shows a schematic block diagram of a device for discharging grit and/or lubricant into the gap between a rail and a track wheel of a rail vehicle according to the prior art.

FIG. 1 shows a schematic block diagram of a device for discharging grit G and/or lubricant O into the gap between a route (e.g., a rail) S and a vehicle wheel (e.g., a track wheel) R of a vehicle Z according to the prior art. The device is arranged at a suitable location in a rail vehicle Z. The vehicle Z travels on corresponding rails S by the track wheels R. Depending on the driving direction A of the vehicle Z, the discharge nozzle 1 for introducing the grit G, particularly sand, and/or the lubricant O or the mixture of grit G and lubricant O for optimizing the coefficient of friction into the gap between the route S and the wheel R is located in front of the respective wheel R. The discharge nozzle 1 is provided with a connection 3 for being connected to a conveyor line F for the grit G and the lubricant O. A channel 4, through which the grit G or the lubricant O is conveyed, is located between the connection 3 and the opposite outlet 5. In the illustrated embodiment, the conveyor line F is connected to a container B for a mixture of grit G and lubricant O. A corresponding metering and conveying device T on the underside of the container B, such as a pneumatic injector or a star feeder, conveys the grit G and/or the lubricant O from the container B to the discharge nozzle 1 through the conveyor line F. The grit G or lubricant O is purposefully introduced into the gap between the rail S and the track wheel R through the outlet 5 of the discharge nozzle. It would also be possible to provide multiple containers B for grit G or lubricant O instead of a single container B for grit G or lubricant O and to transport the grit or lubricant to the gap between the rail S and the track wheel R via a common conveyor line F and a common discharge nozzle 1 or via multiple separate conveyor lines F and a common discharge nozzle 1 or via multiple separate conveyor lines F and multiple discharge nozzles 1.

The highest possible proportion of a metered quantity of grit G or lubricant O or the mixture for optimizing the coefficient of friction is respectively introduced into the gap between the track wheel R of the rail vehicle Z and the rail S by means of the discharge nozzle 1. Due to the traveling speed of the rail vehicle Z in the driving direction A, the relative wind W, but also crosswinds, cause vorticities Y in the region between the discharge nozzle 1 and the track wheel R such that the jet of grit G and lubricant O is deflected and partially ends up adjacent to the rail S.

A control unit may be provided and connected to the metering and conveying device T. As a result, optimal metering and mixing of the grit G or lubricant O or the mixture for optimizing the coefficient of friction can be achieved at best with consideration of influencing factors and environmental parameters. The control unit may also be connected to a sensor for detecting the speed of the rail vehicle Z, as well as to sensors for detecting environmental parameters such as the temperature, the humidity, or the wind speed. Furthermore, the control unit may also be connected to sensors for detecting the state between the track wheel R and the rail S. Such sensors may be realized, for example, in the form of optical devices. The values acquired by such sensors make it possible to determine the coefficient of friction between the track wheel R and the rail S by means of corresponding algorithms. Furthermore, the control unit may also be connected to a (not-shown) GPS receiver to detect the current geographic position of the rail vehicle Z and to also control the discharge of the grit G or lubricant O in dependence on the position of the rail vehicle Z.

Figure 2B:
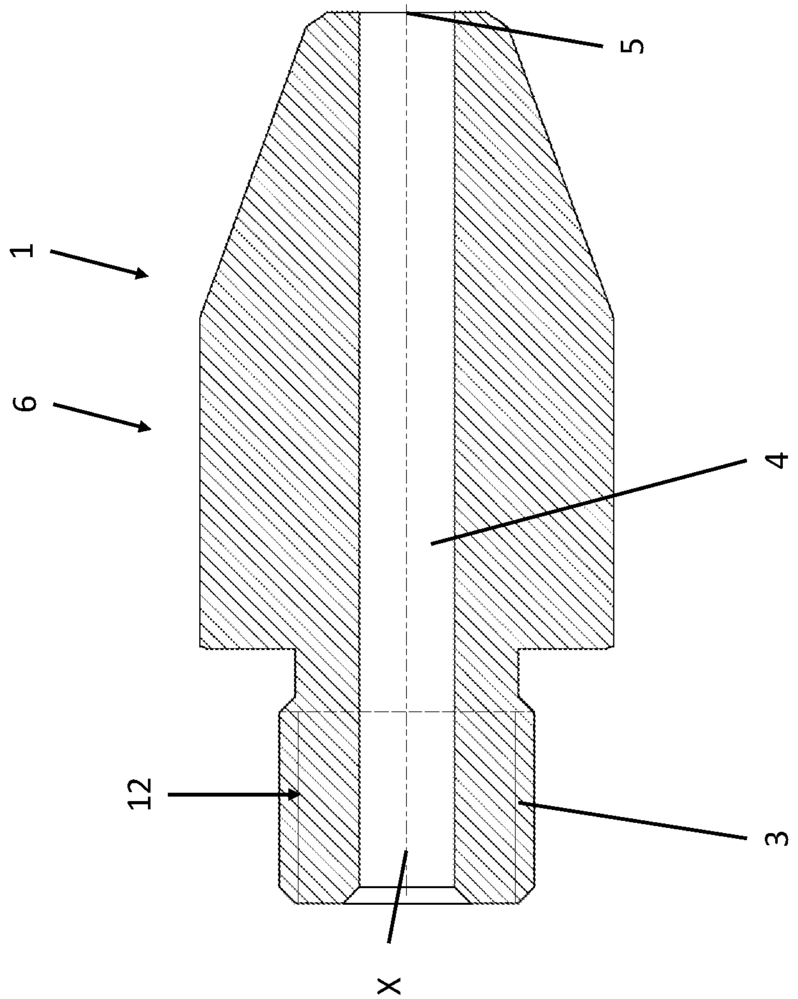
FIGS. 2A and 2B show a front view and a section through a conventional type of discharge nozzle for discharging grit and/or lubricant.
Figure 2A:
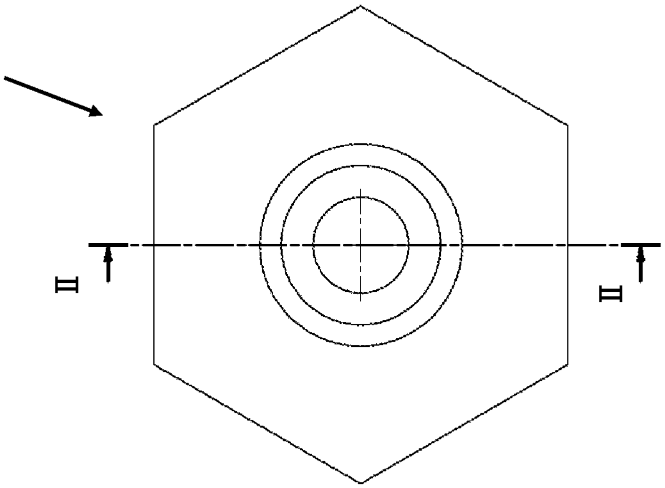

FIG. 2A shows a front view and FIG. 2B shows a section through a conventional type of discharge nozzle 1 for discharging grit G and/or lubricant O along the line of section II-II in FIG. 2A. The discharge nozzle 1 has a connection 3 for being connected to a conveyor line F that may be provided with a thread 12, in this case an external thread, to simplify the installation and removal of the conveyor line F. A channel 4 for conveying the grit G or lubricant O is located between the connection 3 and the outlet 5. In the example shown, the channel 4 is realized in the form of a bore with constant inside diameter. In the rear region 6, which is assigned to the connection 3 and arranged opposite of the outlet 5 referred to the longitudinal direction X, the outer contour or surface of the discharge nozzle 1 is designed symmetrically and converges conically toward the outlet 5 in the front region. A jet with a certain dispersion is formed during the discharge of the grit G or lubricant O. The jet is deflected due to vorticities Y caused by the relative wind W or crosswinds (see FIG. 1) such that only a small proportion of grit G or lubricant O ends up at the intended location, namely in the gap between the rail S and the track wheel R.

Figure 3B:
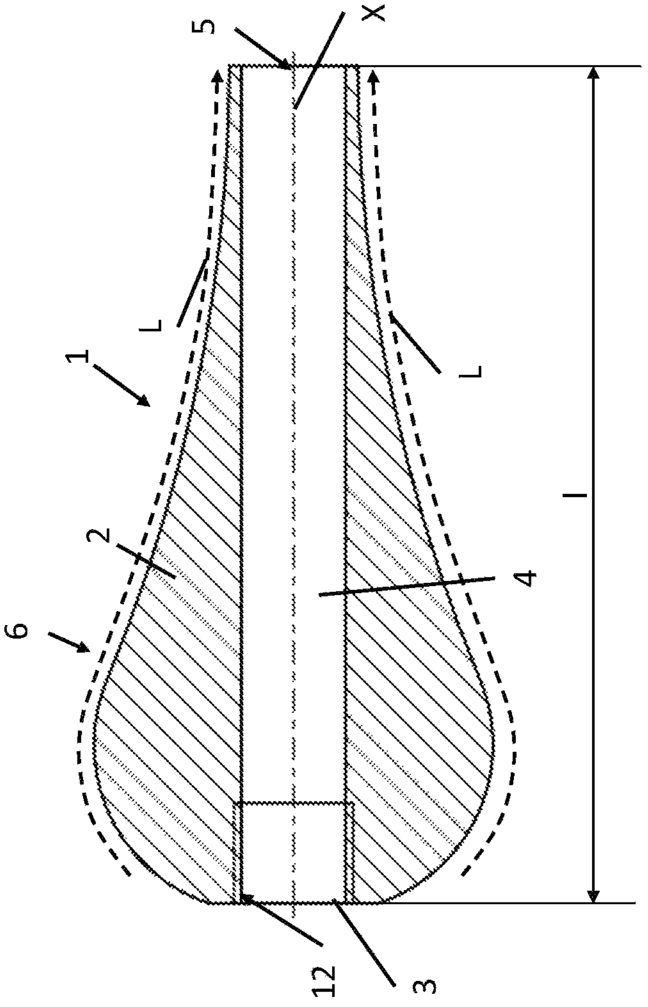
FIGS. 3A and 3B show a front view and a section through a first embodiment of an inventive discharge nozzle, in which the base body has a rotationally symmetrical cross section and the outer contour of the base body is shaped in a convex manner in the rear region.
Figure 3A:
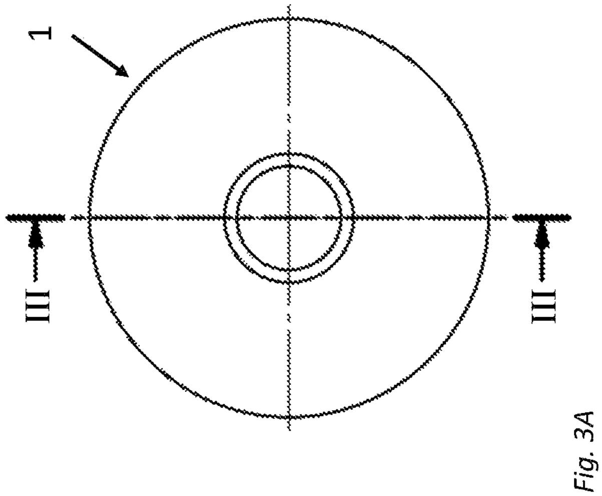

FIG. 3A shows a front view and FIG. 3B shows a section through a first embodiment of an inventive discharge nozzle 1 along the line of section in FIG. 3A. The discharge nozzle 1 comprises a base body 2 that is manufactured of metal or plastic. In the example shown, the connection 3 for being connected to the conveyor line F is realized with a thread 12 in the form of an internal thread. The outer contour of the base body 2 is shaped in a convex manner, i.e. curved outward, in the rear region 6 of the base body 2 assigned to the connection 3. The base body 2 converges toward the outlet 5 in the longitudinal direction X of the discharge nozzle 1 downstream of its convexly shaped rear region 6. The taper of the base body 2 toward the outlet 5 in the longitudinal direction X may be realized straight, i.e. essentially conical, or even shaped in a concave manner, i.e. curved inward. The air L flowing around the discharge nozzle 1 is accelerated toward the outlet 5 in accordance with the Coandă effect due to the concave outer contour of the base body 2 in the rear region 6 of the discharge nozzle 1. In this way, the jet of grit G or lubricant O is in a manner of speaking constricted during the discharge from the outlet 5 of the discharge nozzle 1. As a result, this jet is less sensitive to vorticities Y or other air flows such that a higher proportion of grit G or lubricant O ends up at the intended location in the gap between the rail S and the track wheel R and less grit G or lubricant O is lost. Such a rotationally symmetrical discharge nozzle 1 can be manufactured very easily and cost-effectively. 3D printing processes using metallic materials or plastics may also be considered in addition to conventional mechanical manufacturing processes.

Figure 4:
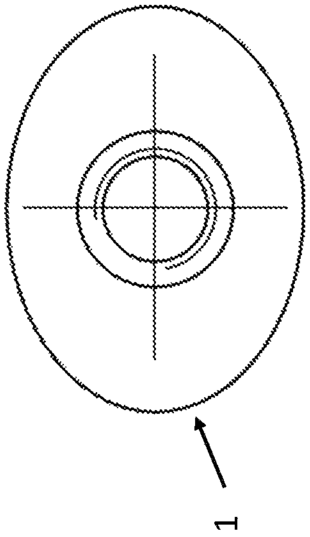
FIG. 4 shows a front view of a second embodiment of an inventive discharge nozzle, in which the base body has an elliptical cross section.

FIG. 4 shows a front view of a second embodiment of an inventive discharge nozzle 1, in which the base body 2 has an elliptical cross section. This type of shape makes it possible to change the flow profile of the surrounding air L and to constrict the jet of grit G and lubricant O asymmetrically. A change of the flow profile can be achieved by rotating the discharge nozzle 1 about the longitudinal axis X. The manufacture of such a discharge nozzle 1 is in fact more elaborate than the manufacture of the discharge nozzle 1 according to FIGS. 3A and 3B but can also be easily and cost-effectively realized with 3D printing processes.

Figure 5B:
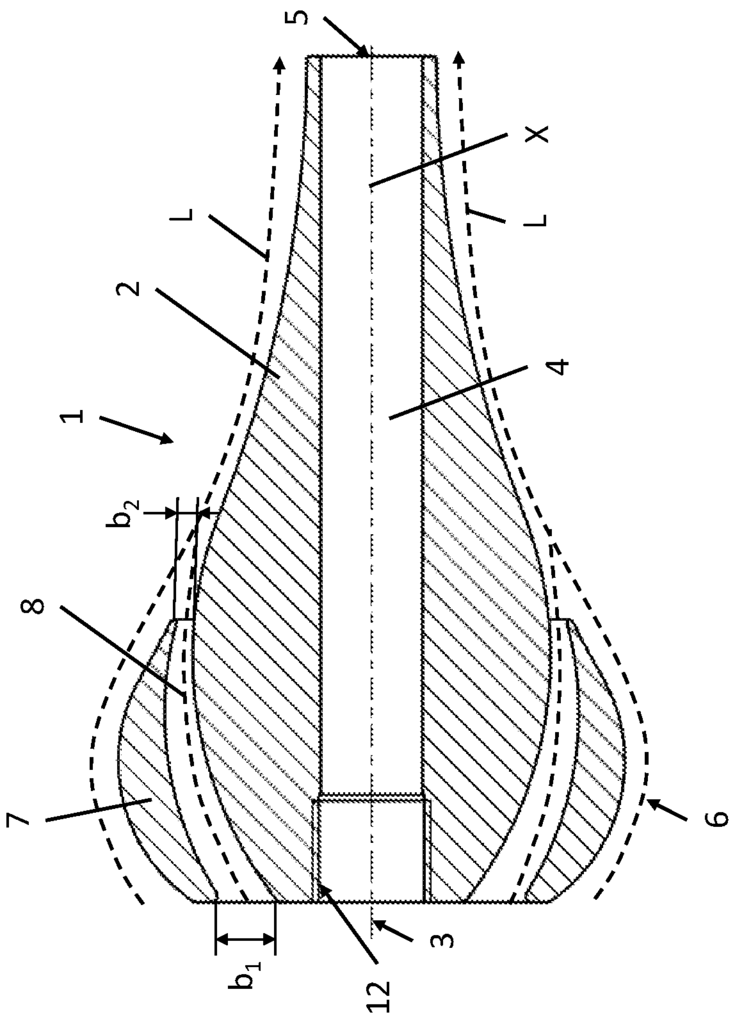
FIGS. 5A and 5B show a front view and a section through another embodiment of an inventive discharge nozzle with an attachment arranged thereon.
Figure 5A:
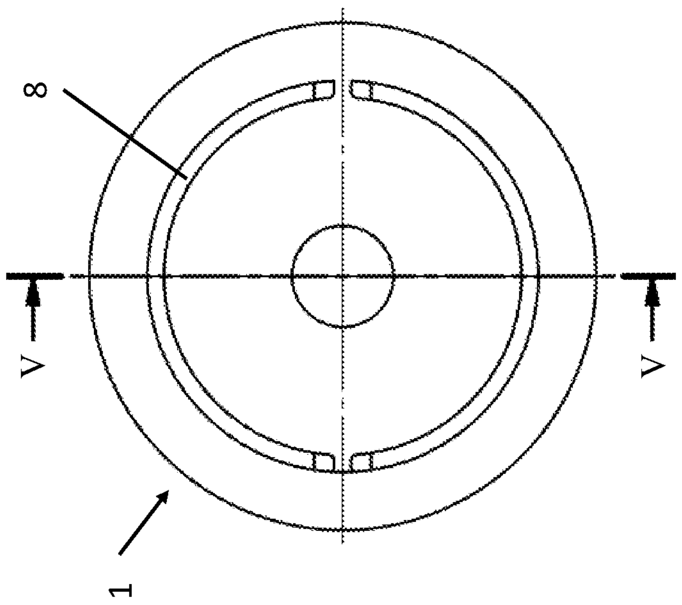

FIG. 5A shows the front view and FIG. 5B shows a section through another embodiment of an inventive discharge nozzle 1 along the line of section V-V in FIG. 5A. In this case, an attachment 7 is arranged on the base body 2, which is shaped similar to the exemplary embodiment in FIG. 3B, in the rear region 6 such that an annular gap 8 is formed between the surface of the base body 2 and the inner side of the attachment 7. The outer side of the attachment 7 may be once again shaped in a convex manner, i.e. curved outward. In addition, the attachment 7 is designed in such a way that the annular gap 8 is tapered in the longitudinal direction X from the rear end of the discharge nozzle 1 at the connection 3 toward the outlet 5. Consequently, the width b 1 of the annular gap 8 at the rear end of the discharge nozzle 1 is greater than the width b" at the front end of the annular gap 8 or at the end of the attachment 7 facing the outlet 5 of the discharge nozzle 1, respectively. In this way, the air L flowing through the annular gap 8 is additionally accelerated in the direction of the outlet 5 of the discharge nozzle 1. The air L flowing past on the outside is accelerated in the direction of the outlet 5 by the outer surface of the attachment 7, which may be shaped in a convex manner. Consequently, the air L surrounding the jet of grit G or lubricant O provides even better protection against external influences on the flow. As a result, the degree of efficiency of the discharge nozzle 1 can be additionally improved.

Figure 6A:
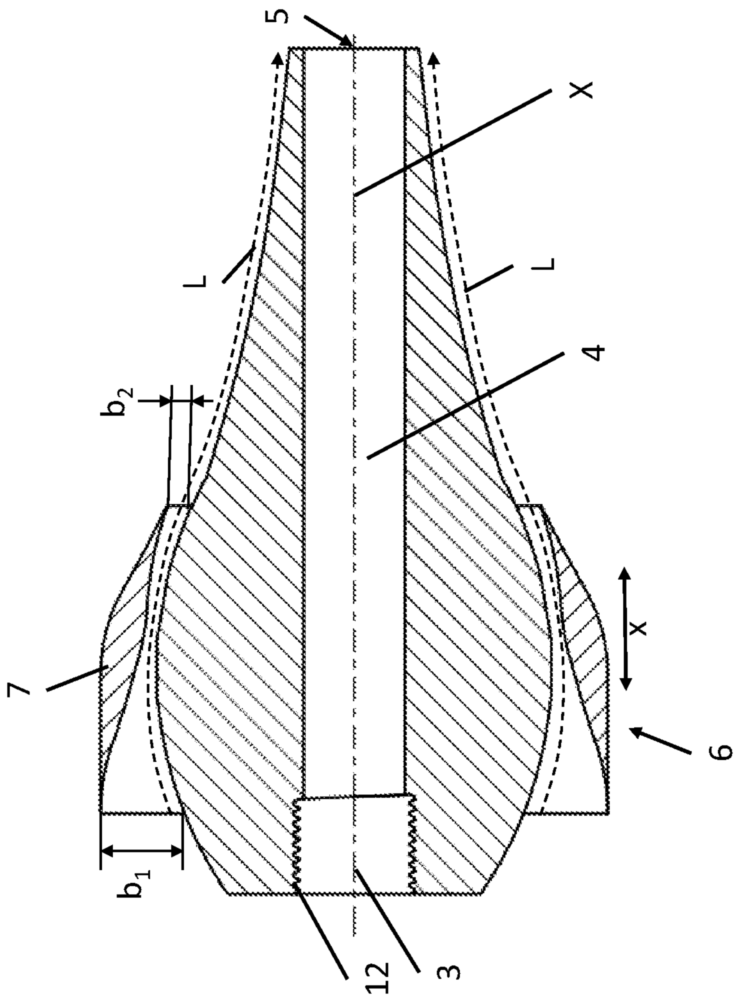
FIGS. 6A to 6B show a front view and a section through another embodiment of an inventive discharge nozzle with an attachment arranged thereon, as well as a perspective view of the attachment.
Figure 6B:
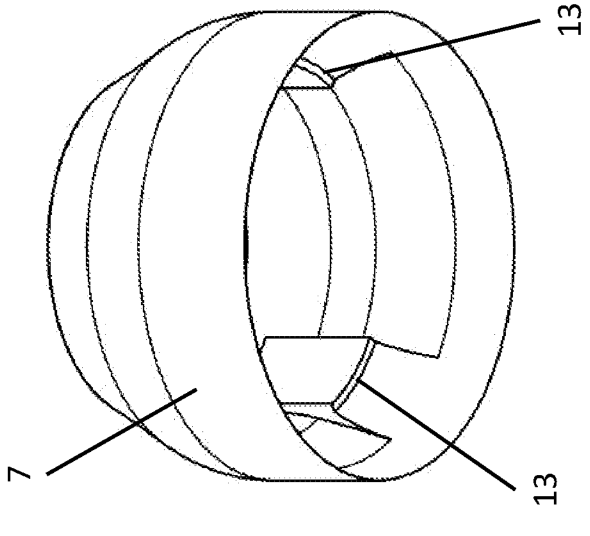

FIG. 6A shows a section through another embodiment of an inventive discharge nozzle 1 with an attachment 7 arranged thereon. FIG. 6B shows a perspective view of the attachment 7 according to FIG. 6A. The outer contour and the inner contour of the attachment 7 are modified in comparison with the embodiment according to FIGS. 5A and 5B such that the shape and the progression of the annular gap 8 are also designed differently. According to another characteristic of the invention, the attachment 7 may be designed to be displaceable in the longitudinal direction X as indicated with the arrows x. A displacement of the attachment 7 makes it possible to change the annular gap 8 and to thereby change the resulting flow of the air L. The use of automatic adjustment options such as corresponding (not-shown) servomotors or the like makes it possible, for example, to control the flow of the air L in dependence on the speed of the rail vehicle Z. The perspective view of the attachment 7 in FIG. 6B shows webs 13 that are required for fastening the attachment on the base body 2 and interrupt the annular gap 8.

Figure 7B:
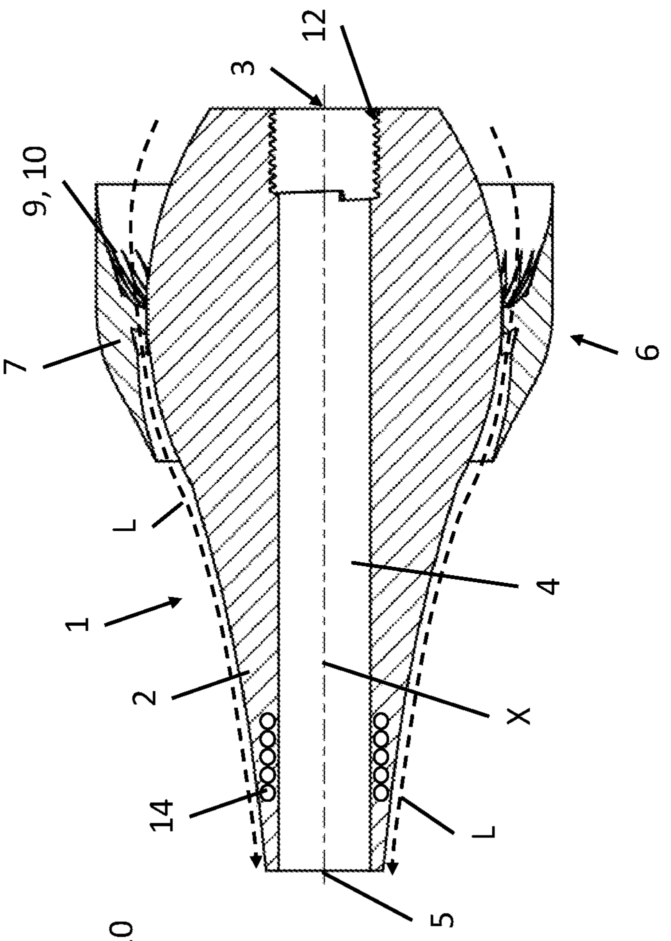
FIGS. 7A and 7B show a rear view and a section through another embodiment of an inventive discharge nozzle with an attachment and blades arranged obliquely therein.
Figure 7A:
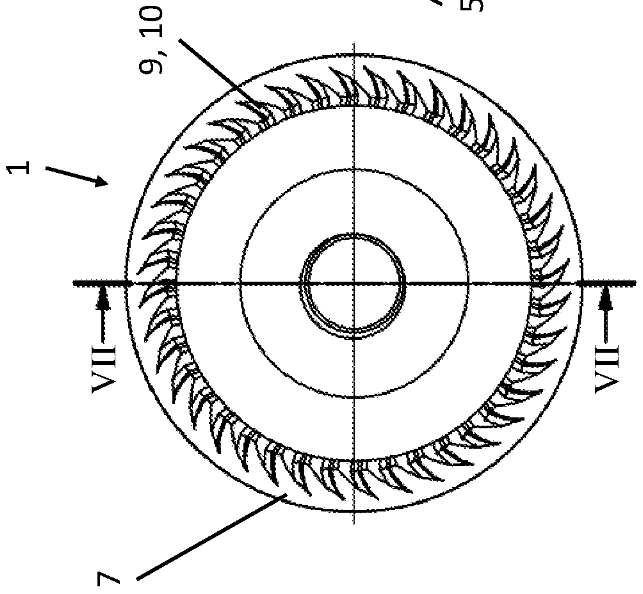

FIG. 7A shows a rear view and FIG. 7B shows a section through another embodiment of an inventive discharge nozzle 1 along the line of section VII-VII in FIG. 7A. The discharge nozzle 1 comprises the base body 2 and an attachment 7, as well as air control elements 9 or blades 10 that are arranged in the attachment and serve for conducting the flow of the surrounding air L. The air control elements 9 or blades 10 make it possible to correspondingly steer the flow of the air L such that the resulting jet of grit G or lubricant O is directed, for example, toward the wheel flange K of the track wheel R. The change in direction of the flow of the air L can be adjusted within certain limits if the air control elements 9 are arranged in an adjustable manner. A heater 14, particularly an electric resistance heater, may be arranged in the region of the outlet 5 of the base body 2 of the discharge nozzle 1.

Figure 8B:
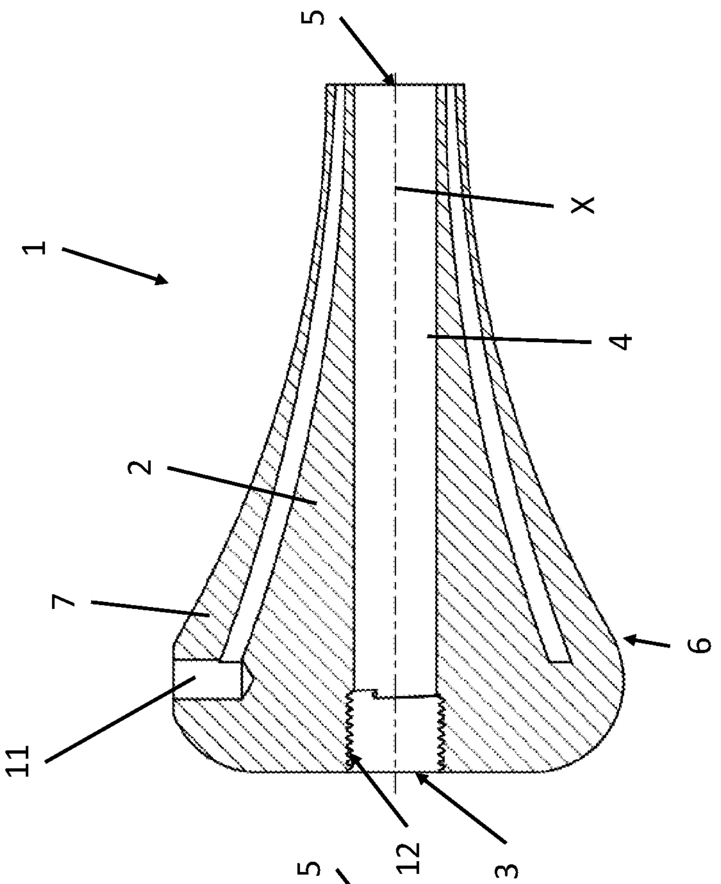
FIGS. 8A and 8B respectively show sections through other embodiments of inventive discharge nozzles with a compressed air connection.
Figure 8A:
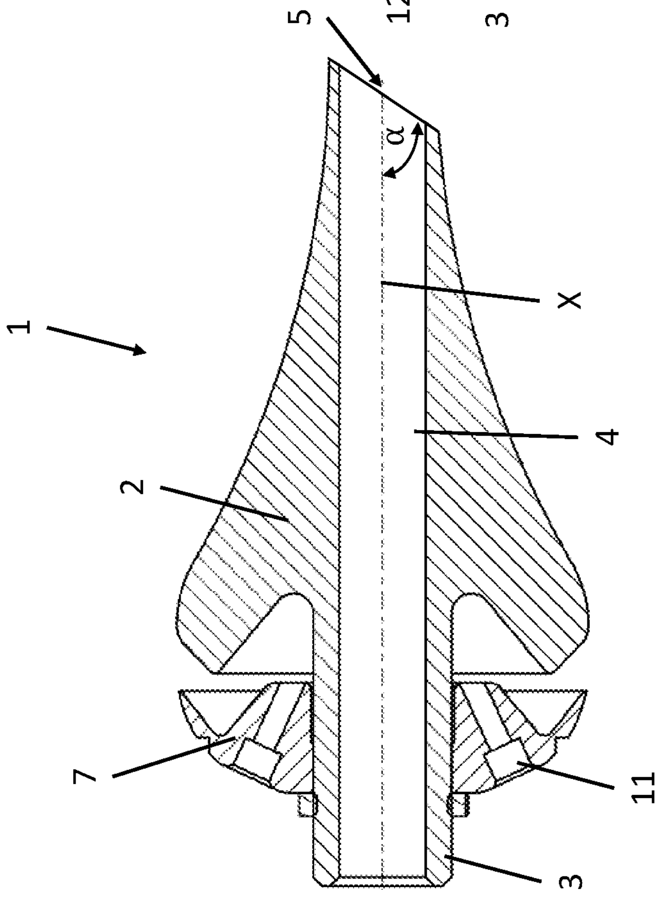

FIGS. 8A and 8B respectively show sections through other embodiments of inventive discharge nozzles 1. In this case, the attachment 7 is closed in the region of the at least one connection 3 of the base body 2 and at least one compressed air connection 11 for being connected to a (not-shown) compressed air line is arranged on the attachment 7. This embodiment of the discharge nozzle 1 is particularly advantageous when the installation situation of the discharge nozzle 1 does not allow any undisturbed access for the surrounding air L. This is the case, for example, in low-floor streetcars. In this case, the compressed air supplied via a compressed air line fulfills the function of the "constriction" of the jet of grit G or lubricant O exiting the outlet 5 of the discharge nozzle 1 to improve the proportion of grit G or lubricant O ending up in the gap between the rail S and the track wheel R. In the exemplary embodiment according to FIG. 8A, the attachment 7 with the compressed air connections 11 for being connected to a compressed air line is arranged separately of the base body 2. In addition, the outlet 5 may be arranged obliquely to the longitudinal axis X at an acute angle α. In the variation according to FIG. 8B, the base body 2 and the attachment 7 with the compressed air connection 11 are respectively realized in one piece or integrally. The integrated attachment 7 and therefore the resulting annular gap 8 between the attachment 7 and the base body 2 extend up to the outlet 5 of the discharge nozzle 1 in this variation.

Figure 9C:
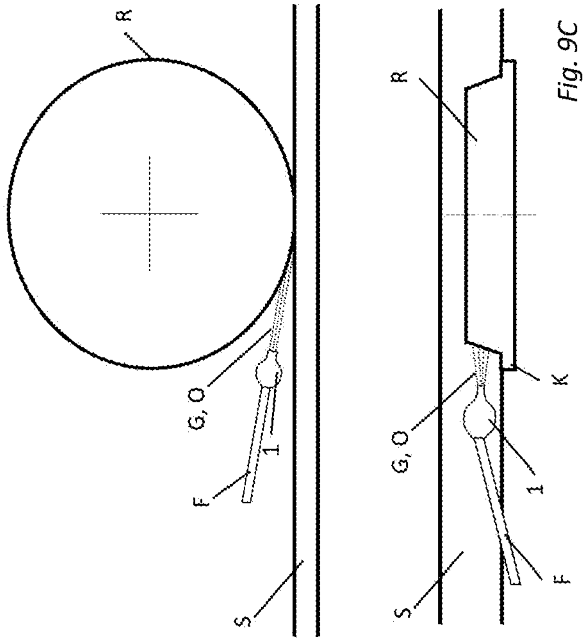
FIGS. 9A to 9D show a comparison of the flow patterns of the discharged grit and/or lubricant in a conventional discharge nozzle and an inventive discharge nozzle.
Figure 9A:
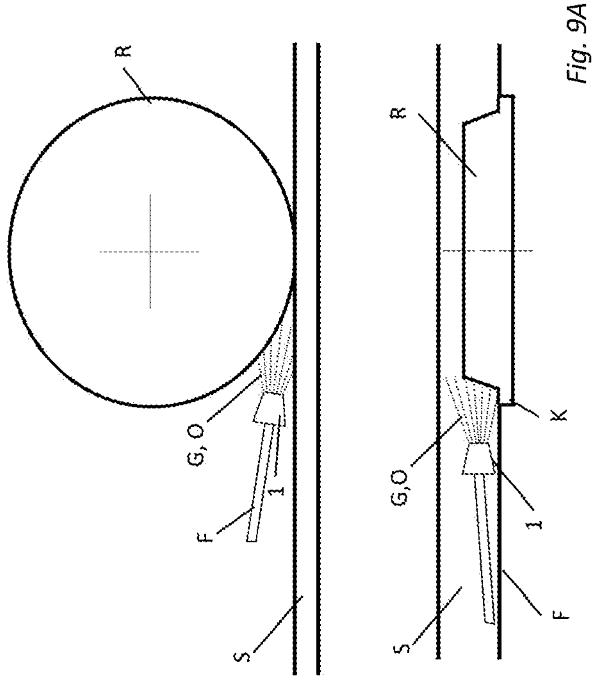
Figure 9D:
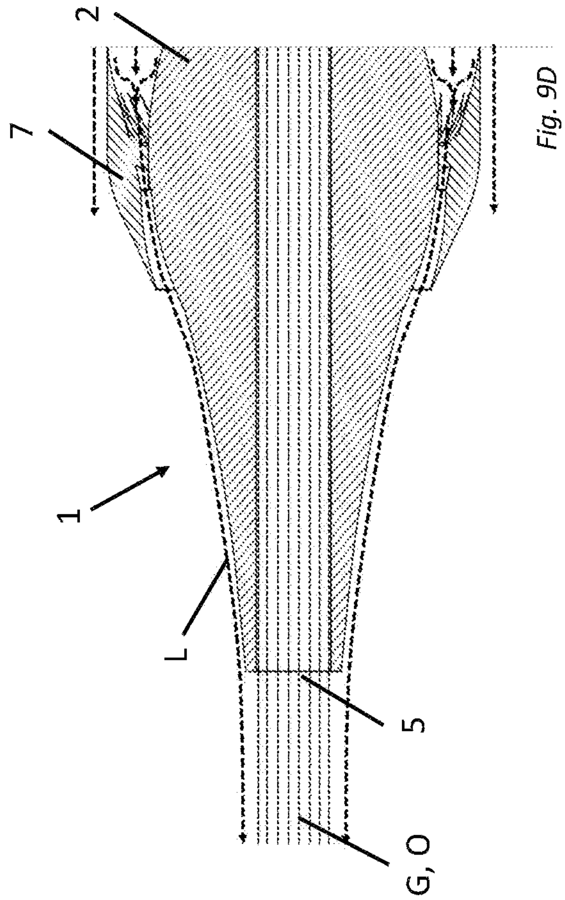
Figure 9B:
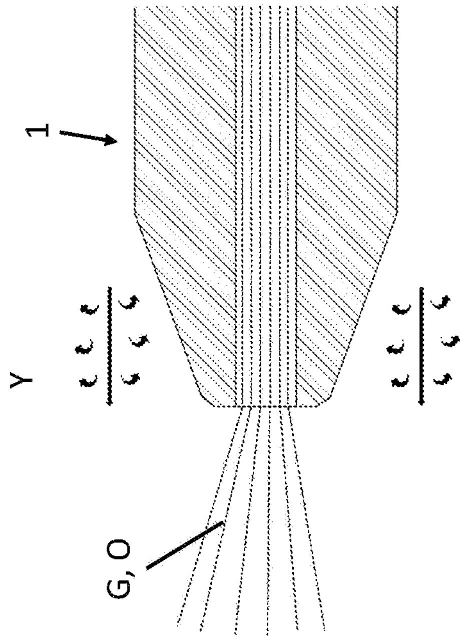

FIGS. 9A to 9D ultimately show the flow patterns of the discharged grit G and/or lubricant O in a conventional discharge nozzle 1 and in an inventive discharge nozzle 1. In a discharge nozzle 1 according to the prior art, which is illustrated in FIGS. 9A and 9B, a relatively high dispersion of the jet of grit G or lubricant O takes place such that only a small proportion of grit G or lubricant O arrives in the gap between the rail S and the track wheel R.

In the inventive embodiment of the discharge nozzle 1 illustrated in FIGS. 9C and 9D, in contrast, the flow pattern of the jet of grit G or lubricant O is constricted by the flow of the air L surrounding the discharge nozzle 1 such that significantly more grit G or lubricant O can be introduced into the gap between the rail S and the track wheel R and fulfill its function therein.

The inventive discharge nozzle 1 makes it possible to increase the degree of efficiency of the discharge system and to reduce the resulting costs.

The invention claimed is:

1. A discharge nozzle for discharging grit or lubricant into a gap between a route and a wheel of a vehicle, the discharge nozzle comprising:

a base body with at least one connection for being connected to a conveyor line for the grit or the lubricant and an outlet that is connected to the at least one connection via a channel, wherein an outer contour of the base body is shaped in a convex manner in a longitudinal direction at least in a rear region of the base body lying opposite of the outlet such that air flowing around the base body is accelerated in a direction of the outlet.

2. The discharge nozzle according to claim 1, wherein the outer contour of the base body is shaped in the convex manner in the longitudinal direction over an entire length of the base body.

3. The discharge nozzle according to claim 1, wherein a circumferential attachment is arranged in the rear region of the base body and an annular gap is formed between a surface of the base body and an inner side of the circumferential attachment.

4. The discharge nozzle according to claim 3, wherein the annular gap is tapered in the direction of the outlet.

5. The discharge nozzle according to claim 3, wherein the circumferential attachment is arranged to be adjustable relative to the base body in the longitudinal direction.

6. The discharge nozzle according to claim 3, wherein the base body includes air control elements for conducting the flow of the air on one or more of: (a) an inner side of the circumferential attachment or (b) on the surface of the base body.

7. The discharge nozzle according to claim 6, wherein the air control elements are arranged to be adjustable.

8. The discharge nozzle according to claim 6, wherein the air control elements are formed by blades obliquely arranged relative to the longitudinal direction.

9. The discharge nozzle according to claim 3, wherein the circumferential attachment is closed in a region of the at least one connection and the circumferential attachment includes at least one compressed air connection for being connected to a compressed air line.

10. The discharge nozzle according to claim 3, wherein one or more of: (a) the base body or (b) the circumferential attachment is formed from three dimensional printed metal.

11. The discharge nozzle according to claim 3, wherein one or more of (a) the base body or (b) the circumferential attachment is formed from three dimensional printed plastic.

12. The discharge nozzle according to claim 3, wherein one or more of: (a) the base body or (b) the attachment has a circular cross section.

13. The discharge nozzle according to claim 3, wherein one or more of: (a) the base body or (b) the attachment has an elliptical cross section.

14. The discharge nozzle according to claim 1, further comprising:

a heater arranged on the base body.

15. The discharge nozzle according to claim 1, wherein the outlet is arranged at an acute angle to the longitudinal direction.

16. A discharge nozzle, comprising:

a base body configured to be connected to a conveyor line for receiving one or more of a grit or a lubricant for a route surface, the base body including an outlet configured to be connected with the conveyor line from which the one or more of the grit or the lubricant is directed out of the base body, the base body having a convex shape in a longitudinal direction at least in a rear region of the base body that is opposite of the outlet such that air flowing around the base body is accelerated in a direction of the outlet.

17. The discharge nozzle of claim 16, further comprising:

a circumferential attachment in the rear region of the base body that is separated from the base body by an annular gap.

18. The discharge nozzle according to claim 17, wherein the annular gap is tapered in the direction of the outlet.

19. A discharge nozzle, comprising:

a base body configured to receive one or more of grit or lubricant for a route, the base body including an outlet through which the one or more of the grit or the lubricant is directed out of the base body toward a gap between a route surface and a vehicle wheel, the base body shaped in a convex manner in a longitudinal direction such that air flowing around the base body is accelerated in a direction of the outlet.

20. The discharge nozzle according to claim 19, further comprising:

a circumferential attachment arranged in a rear region of the base body with a tapered annular gap between a surface of the base body and an inner side of the circumferential attachment, the base body including air control elements configured to conduct the flow of the air on one or more of: (a) an inner side of the circumferential attachment or (b) on the surface of the base body.

* * * * *